United States Patent
Hiromitsu et al.

(10) Patent No.: US 11,136,013 B2
(45) Date of Patent: Oct. 5, 2021

(54) VEHICLE CONTROL APPARATUS AND VEHICLE CONTROL METHOD

(71) Applicants: DENSO CORPORATION, Kariya (JP); TOYOTA JIDOSHA KABUSHIKI KAISHA, Toyota (JP)

(72) Inventors: Takayuki Hiromitsu, Kariya (JP); Shinji Kitaura, Kariya (JP); Akihiro Kida, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/461,164

(22) PCT Filed: Oct. 30, 2017

(86) PCT No.: PCT/JP2017/039079
§ 371 (c)(1),
(2) Date: May 15, 2019

(87) PCT Pub. No.: WO2018/092564
PCT Pub. Date: May 24, 2018

(65) Prior Publication Data
US 2019/0275993 A1      Sep. 12, 2019

(30) Foreign Application Priority Data

Nov. 17, 2016   (JP) ............................... JP2016-224528

(51) Int. Cl.
*G08G 1/01*      (2006.01)
*B60T 7/22*      (2006.01)
(Continued)

(52) U.S. Cl.
CPC ................ *B60T 7/22* (2013.01); *B60Q 9/008* (2013.01); *B60R 21/00* (2013.01); *B60W 30/095* (2013.01);
(Continued)

(58) Field of Classification Search
CPC ..... B60T 7/22; B60T 2201/022; B60R 21/00; G08G 1/16; G08G 1/166; B60W 30/095; B60Q 9/008
See application file for complete search history.

(56) References Cited

U.S. PATENT DOCUMENTS

2014/0316668 A1*  10/2014  Akiyama ................. B60T 7/22
                                                                701/70
2015/0094943 A1   4/2015   Yoshihama et al.
(Continued)

FOREIGN PATENT DOCUMENTS

| CN | 104246849 A | 12/2014 |
| CN | 105035082 A | 11/2015 |
| JP | 2007-317018 A | 12/2007 |

*Primary Examiner* — Toan N Pham
(74) *Attorney, Agent, or Firm* — Maschoff Brennan (57) ABSTRACT

In a vehicle control apparatus, an acquiring unit acquires detection information from a probe apparatus based on reflected waves thereof. A target object information detecting unit detects a position of a target object. A target object route estimating unit estimates a route of the target object. An own vehicle route estimating unit estimates a route of an own vehicle. A collision determining unit determines whether the own vehicle and the target object will collide. A vehicle control unit performs vehicle control of the own vehicle when the own vehicle and the target object are determined to collide. An area setting unit sets a non-operating area for vehicle control. The area setting unit sets, as the non-operating area, a predetermined area with refer- (Continued)

ence to a position in which the target object is detected, in a lateral direction that is orthogonal to an advancing direction of the own vehicle.

11 Claims, 4 Drawing Sheets

(51) Int. Cl.
  *B60Q 9/00* (2006.01)
  *G08G 1/16* (2006.01)
  *B60R 21/00* (2006.01)
  *B60W 30/095* (2012.01)
(52) U.S. Cl.
  CPC ............... *G08G 1/16* (2013.01); *G08G 1/166* (2013.01); *B60T 2201/022* (2013.01)

(56) References Cited

U.S. PATENT DOCUMENTS

| | | | |
|---|---|---|---|
| 2015/0307093 A1 | 10/2015 | Sasabuchi | |
| 2020/0074860 A1* | 3/2020 | Kitaura | ............... B60R 21/0132 |
| 2020/0218913 A1* | 7/2020 | Unnikrishnan | ...... G06K 9/6218 |

\* cited by examiner

FIG.6

VEHICLE CONTROL APPARATUS AND VEHICLE CONTROL METHOD

CROSS-REFERENCE TO RELATED APPLICATIONS

The present application is a national stage application of PCT Application No. PCT/JP2017/039079, filed on Oct. 30, 2017, which claims priority to Japanese Patent Application No. 2016-224528, filed Nov. 17, 2016, the descriptions of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to a vehicle control apparatus that performs vehicle control based on detected information of a target object, and a vehicle control method.

BACKGROUND ART

Conventionally, a collision determination apparatus that determines a collision between an own vehicle and a target object, and provides traveling safety of a vehicle is known (for example, PTL 1). In PTL 1, a system electronic control unit (ECU) acquires the behavior of the own vehicle from a vehicle speed sensor and the like, and predicts a route of the own vehicle. Meanwhile, a radar ECU detects a position of another vehicle (target object) by a millimeter-wave radar apparatus, and predicts a route of the other vehicle based on changes in the position. Then, the system ECU performs a collision determination based on the predicted route of the own vehicle and the predicted route of the other vehicle. When determined that the own vehicle and the other vehicle will collide, the system ECU performs vehicle control such as applying a brake on the vehicle. As a result, traveling safety of the vehicle can be provided.

CITATION LIST

Patent Literature

[PTL 1] JP-A-2007-317018

SUMMARY OF INVENTION

Here, the millimeter-wave radar apparatus detects information of a position of the other vehicle based on reflected waves from the other vehicle. Therefore, when the route of the other vehicle is estimated based on the detected information from the millimeter-wave radar apparatus, the route may be erroneously estimated due to the effects of unwanted reflected waves (unwanted waves). As such a case, specifically, a case in which, when the own vehicle is moved in reverse to perform parallel parking, a stopped vehicle is present immediately behind the own vehicle and a traveling vehicle that passes beside the stopped vehicle from diagonally behind the stopped vehicle can be considered. Even in cases in which the traveling vehicle that is traveling from behind the own vehicle advances straight ahead in an adjacent traffic lane and passes beside the own vehicle, when the traveling vehicle approaches the stopped vehicle and comes abreast of the stopped vehicle, the effects of the reflected waves (unwanted waves) from the stopped vehicle may be received. The unwanted waves may be erroneously detected as the reflected waves from the traveling vehicle.

When erroneous detection occurs in this manner, the route of the traveling vehicle becomes erroneous. Specifically, a route in which the traveling vehicle turns and passes directly behind the own vehicle (more specifically, the position of the stopped vehicle) and, furthermore, approaches the rear of the own vehicle is estimated. The route such as that in which the traveling vehicle approaches the rear of the own vehicle is estimated due to the effect of the traveling vehicle advancing straight ahead. When the collision determination is performed based on a route that is erroneous in this manner, a determination that a collision with the traveling vehicle will occur is made, regardless of the collision not occurring. Therefore, unnecessary vehicle control may be performed, such as by unnecessary braking or warning being performed.

The present disclosure has been implemented in light of the above-described issues. The main object of the present disclosure is to provide a vehicle control apparatus that suppresses unnecessary vehicle control, and a vehicle control method.

The present disclosure is configured in the following manner to solve the above-described issues.

A vehicle control apparatus of the present disclosure includes: an acquiring unit that acquires detected information from a probe apparatus that transmits probe waves and receives reflected waves that are reflected by a target object, the detected information being based on the reflected waves; a target object information detecting unit that detects a position of the target object based on the detected information; a target object route estimating unit that estimates a route of the target object based on changes in the position of the target object detected by the target object information detecting unit; an own vehicle route estimating unit that estimates a route of an own vehicle; a collision determining unit that determines whether the own vehicle and the target object will collide, based on the route of the target object estimated by the target object route estimating unit and the route of the own vehicle estimated by the own vehicle route estimating unit; a vehicle control unit that performs vehicle control of the own vehicle when the collision determining unit determines that the own vehicle and the target object will collide; and an area setting unit that sets a non-operating area for vehicle control. The area setting unit sets, as the non-operating area, a predetermined area with reference to a position in which the target object is detected, in a lateral direction that is orthogonal to an advancing direction of the own vehicle.

When the target object and an object other than the target object that reflects the probe waves are positioned side-by-side in the lateral direction that is orthogonal to the advancing direction of the own vehicle within the predetermined area in the lateral direction, a likelihood that the position of the target object will be erroneously detected based on an unwanted reflected waves from the object other than the target object is present. Therefore, the non-operating area is set in a predetermined area with reference to the target object in the lateral direction that is orthogonal to the advancing direction of the own vehicle. As a result, for example, even if a stopped vehicle or the like is present beside the target object in the non-operating area and the position of the target object be erroneously detected based on the unwanted reflected waves from the stopped vehicle or the like, as long as the erroneously detected position of the target object (that is, the position of the stopped vehicle or the like that has generated the unwanted waves) is present within the non-operating area, vehicle control is not performed. Consequently, for example, in cases in which the target object is advancing straight ahead, even if the effects of unwanted reflected waves from an object other than the target object are received and the route is erroneously estimated, unnecessary vehicle control can be suppressed.

Meanwhile, when the position of the target object is detected and a collision is determined to occur in an area other than the non-operating area based on the reflected waves, vehicle control is performed. That is, in cases in which the target object actually makes a turn or the like, the target object is detected in an area other than the non-operating area. Therefore, in this case, vehicle control can be appropriately performed.

BRIEF DESCRIPTION OF DRAWINGS

The above-described object, other objects, characteristics, and advantages of the present disclosure will be further clarified through the detailed description below, with reference to the accompanying drawings. The drawings are as follows.

DESCRIPTION OF EMBODIMENTS

Figure 1:
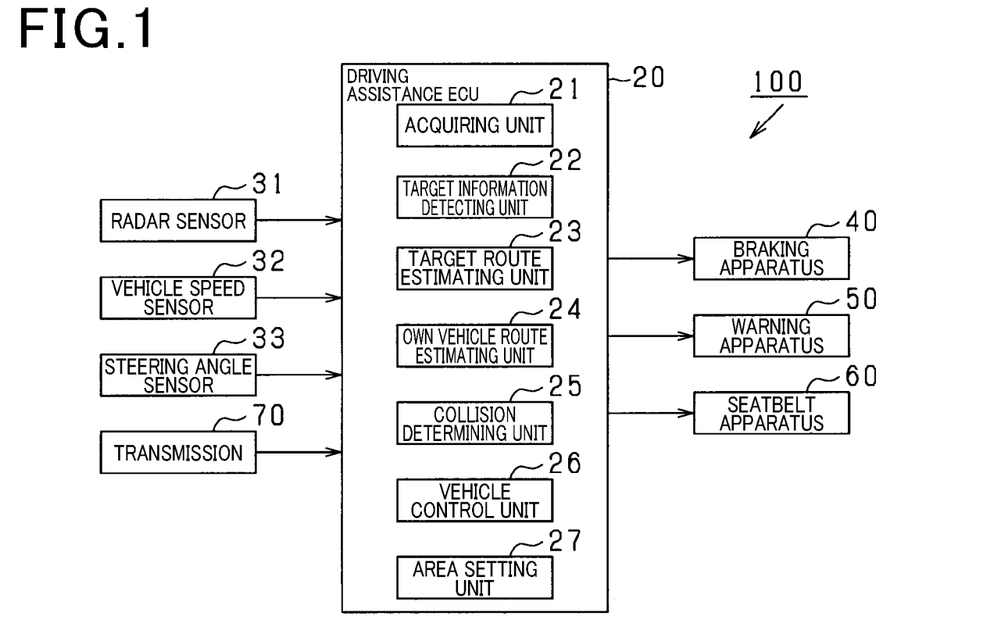
FIG. 1 is a configuration diagram of a PCSS.

An embodiment of the present disclosure will hereinafter be described with reference to the drawings. Sections among the embodiments below that are identical or equivalent to each other are given the same reference numbers in the drawings FIG. 1 shows a pre-crash safety system (PCSS) 100 to which the vehicle control apparatus and the vehicle control method are applied. The PCSS 100 is an example of a vehicle system that is mounted in a vehicle. The PCSS 100 detects an object that is positioned in a vehicle periphery. When a risk of collision between the detected object and the vehicle is present, the PCSS 100 performs an operation to avoid collision of the own vehicle with the object or an operation to mitigate the collision (PCS). Hereafter, the vehicle in which the PCSS 100 is mounted is referred to as an own vehicle CS. The object to be detected is referred to as a target object Ob.

The PCSS 100 shown in FIG. 1 includes various sensors, a driving assistance ECU 20, a braking apparatus 40, a warning apparatus 50, a seatbelt apparatus 60, and a transmission 70. According to the embodiment shown in FIG. 1, the driving assistance ECU 20 functions as the vehicle control apparatus.

The various sensors are connected to the driving assistance ECU 20. The various sensors output detected information of the target object Ob and vehicle information related to the own vehicle CS to the driving assistance ECU 20. In FIG. 1, the various sensors include a radar sensor 31, a vehicle speed sensor 32, and a steering angle sensor 33. The radar sensor 31 serves as a probe apparatus.

For example, the radar sensor 31 is a publicly known millimeter-wave radar apparatus in which a millimeter wave-band high-frequency signal serves as a transmission wave. The radar sensor 31 is provided in a rear end portion of the own vehicle CS. The radar sensor 31 sets an area within a predetermined detection angle as a detection range and detects a position Pr of the target object Ob within the detection range. Specifically, the radar sensor 31 transmits probe waves at a predetermined cycle and receives reflected waves through a plurality of antennas. A distance to the target object Ob is calculated based on a transmission time of the probe waves and a reception time of the reflected waves. In addition, a relative speed is calculated based on a frequency of the reflected wave reflected by the target object Ob that changes as a result of the Doppler effect. Furthermore, an orientation of the target object Ob is calculated based on a phase difference in the reflected wave received by the plurality of antennas. When the distance to the object Ob and the orientation can be calculated, a relative position of the target object Ob relative to the own vehicle CS can be identified.

The radar sensor 31 performs transmission of the probe waves, reception of the reflected wave, calculation of the distance, calculation of the orientation, and calculation of the relative speed at a predetermined cycle. The radar sensor 31 then outputs, to the driving assistance ECU 20, the calculated distance to the target object Ob, orientation, and relative speed of the target object Ob as radar detection information. The radar sensor 31 may calculate the relative position of the target object Ob and output the relative position as the radar detection information.

The vehicle speed sensor 32 detects a current vehicle speed of the own vehicle CS. The detected vehicle speed is inputted to the driving assistance ECU 20. The steering angle sensor 33 detects a steering angle of a steering wheel (or tires). The detected steering angle is inputted to the driving assistance ECU 20.

The braking apparatus 40 includes a brake mechanism and a brake ECU. The brake mechanism changes a braking force of the own vehicle CS. The brake ECU controls operation of the brake mechanism. The brake ECU is communicably connected to the driving assistance ECU 20, and controls the brake mechanism under control by the driving assistance ECU 20. For example, the brake mechanism includes a master cylinder, a wheel cylinder that applies the braking force to the wheel (tire), and an anti-lock braking system (ABS) actuator that adjusts distribution of pressure (hydraulic pressure) from the master cylinder to the wheel cylinder. The ABS actuator is connected to the brake ECU. The ABS actuator adjusts an operating amount for the wheel (tire) by adjusting the hydraulic pressure from the master cylinder to the wheel cylinder under control by the brake ECU.

The warning apparatus 50 issues a warning to a driver that the target object Ob that is approaching the own vehicle rear is present, under control by the driving assistance ECU 20. For example, the warning apparatus 50 is configured by a speaker that is provided inside the vehicle cabin and a display unit that displays images.

The seatbelt apparatus 60 is configured by a seatbelt that is provided for each seat in the own vehicle and a pretensioner that pulls the seatbelt. When the likelihood of the own vehicle CS colliding with the target object Ob increases, the seatbelt apparatus 60 performs a preliminary operation of pulling the seatbelt as a PCS operation. In addition, when the collision cannot be avoided, the seatbelt apparatus 60 pulls the seatbelt to eliminate slack, thereby fixing a passenger, such as the driver, to the seat and protecting the passenger.

The transmission 70 sets a shift position of the own vehicle CS by a shift lever or the like (not shown) being operated by the driver. For example, the shift position includes at least an R position (reverse) that is a position indicating that the own vehicle CS is in a reversing state, and a D position (drive) that is a position indicating that the own vehicle CS is in an advancing state. An N position (neutral), a P position (parking), and the like are also shift positions. Information indicating the shift position is inputted to the driving assistance ECU 20.

The driving assistance ECU 20 is configured as a known microcomputer that includes a central processing unit (CPU), a read-only memory (ROM), and a random access memory (RAM). The driving assistance ECU 20 performs vehicle control of the own vehicle CS by referencing a calculation program and control data in the ROM. According to the present embodiment, when the own vehicle CS is in the reversing state, that is, the shift position is the R position, the driving assistance ECU 20 performs PCS. Specifically, when the shift position is the R position, the driving assistance ECU 20 acquires the radar detection information from the radar sensor 31 and detects the position Pr of the target object Ob based on the acquired radar detection information. Then, based on the detection result, the driving assistance ECU 20 performs PCS with at least any of the apparatuses 40, 50, and 60 as a subject to be controlled. When performing PCS, the driving assistance ECU 20 functions as an acquiring unit 21, a target object information detecting unit 22, a target object route estimating unit 23, an own vehicle route estimating unit 24, a collision determining unit 25, a vehicle control unit 26, and an area setting unit 27 by running the program stored in the ROM. Each function will be described below.

The acquiring unit 21 acquires the radar detection information inputted from the radar sensor 31. In addition, the acquiring unit 21 acquires the information indicating the vehicle speed of the own vehicle CS from the vehicle speed sensor 32, and acquires the information indicating the steering angle from the steering angle sensor 33. Furthermore, the acquiring unit 21 acquires the information indicating the shift position from the transmission 70.

The target object information detecting unit 22 detects the position Pr of the target object Ob based on the radar detection information. Specifically, the target object information detecting unit 22 detects the position Pr on coordinates of which the own vehicle CS is a point of origin, based on the distance and orientation of the target object Ob included in the radar detection information. In the coordinates, an X axis is set along a vehicle-width direction of the own vehicle CS and a Y axis is set along an advancing direction of the own vehicle CS. More specifically, a center point of the rear wheels of the own vehicle CS is set as the point of origin. As a result, the relative position of the target object Ob relative to the own vehicle CS is detected. Here, a lateral direction orthogonal to the advancing direction (Y-axis direction) is the vehicle-width direction (X-axis direction). In addition, when the radar detection information includes the relative position of the target object Ob, the relative position may be acquired and used as the detection result. The position Pr is recorded in history information.

Figure 2:
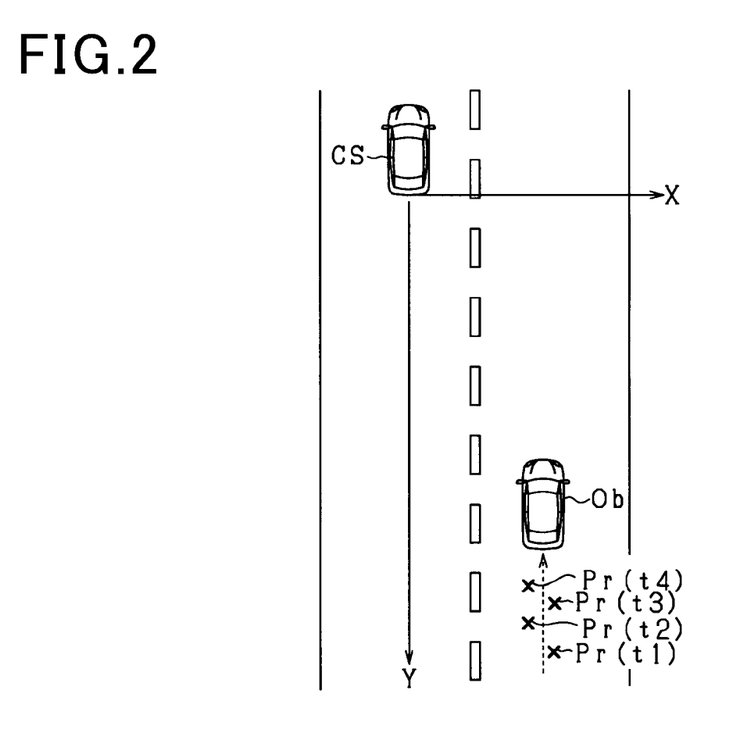
FIG. 2 is a diagram of a route of a target object.

The target object route estimating unit 23 estimates a route of the target object Ob based on changes in the position Pr stored as the history information. For example, as the route of the target object Ob, a movement-direction vector of the target object Ob is calculated. In FIG. 2, the position Pr of a vehicle detected as the target object Ob at each time from time t1 to t4 and the route of the target object Ob calculated based on the positions Pr are shown. Time t4 is a newest position Pr of the target object Ob recorded in the history information. For example, the target object route estimating unit 23 estimates a straight line passing through a position closest to each position Pr as the route of the target object Ob using a known linear interpolation calculation referred to as a least-square method.

The own vehicle route estimating unit 24 estimates a route of the own vehicle CS based on the vehicle speed and the steering angle. For example, a turning direction, a turning radius, a turning center, and the like are calculated based on the vehicle speed and the steering angle, and the route of the own vehicle CS is estimated. When the steering angle is 0 degrees, the route of the own vehicle CS is estimated by a straight line. When the steering angle is other than 0 degrees, the route of the own vehicle CS is estimated by a curved line. Here, the turning direction may be identified based on the steering angle, and the route of the own vehicle CS may be estimated by a straight line along the turning direction. In addition, when the vehicle speed is 0 km/h, the own vehicle is stopped. The route of the own vehicle CS is fixed at a current location.

The collision determining unit 25 determines whether the own vehicle CS and the target object Ob will collide (whether a likelihood of a collision is present) based on the estimated route of the target object Ob and route of the own vehicle CS. For example, when the route of the target object Ob and the route of the own vehicle CS intersect, the collision determining unit 25 determines that the likelihood of a collision between the own vehicle CS and the target object Ob is present.

Here, when the collision determination is performed, the collision determining unit 25 may determine whether the collision will occur by taking into consideration the vehicle width of the own vehicle CS. For example, the collision determining unit 25 estimates a route through which a left-side rear end portion (such as a left-side rear wheel or a left-side taillight) of the own vehicle SC passes and a route through which a right-side rear end portion (such as a right-side rear wheel or a right-side taillight) passes, based on the estimated route of the own vehicle CS and the vehicle width of the own vehicle CS. Then, the collision determining unit 25 may perform the determination based on whether either of the estimated routes and the route of the target object Ob intersect. In a similar manner, the collision determination may be performed by taking into consideration the width of the target object Ob.

The vehicle control unit 26 calculates a collision margin time (TTC) until collision between the own vehicle CS and the target object Ob with which the likelihood of a collision is determined to be present. The collision margin time is calculated by the distance to the target object Ob (inter-vehicle distance) being divided by the relative speed relative to the target object Ob. Here, as the relative speed, the relative speed included in the radar detection information may be used. The vehicle control unit 26 controls the warning apparatus 50, the braking apparatus 40, and the seatbelt apparatus 60 based on the TTC and thereby performs PCS.

Here, the detection angle of the radar sensor 31 that is attached to the vehicle rear is set to be wider, compared to a radar sensor that is attached to a vehicle front. For example, the radar sensor 31 has a detection angle such that the detection range includes, not only an own traffic lane, but also an adjacent traffic lane of the own traffic lane, within a range of a predetermined distance (such as 10 meters to 20 meters) in the Y-axis direction from the rear of the own vehicle CS.

Figure 3:
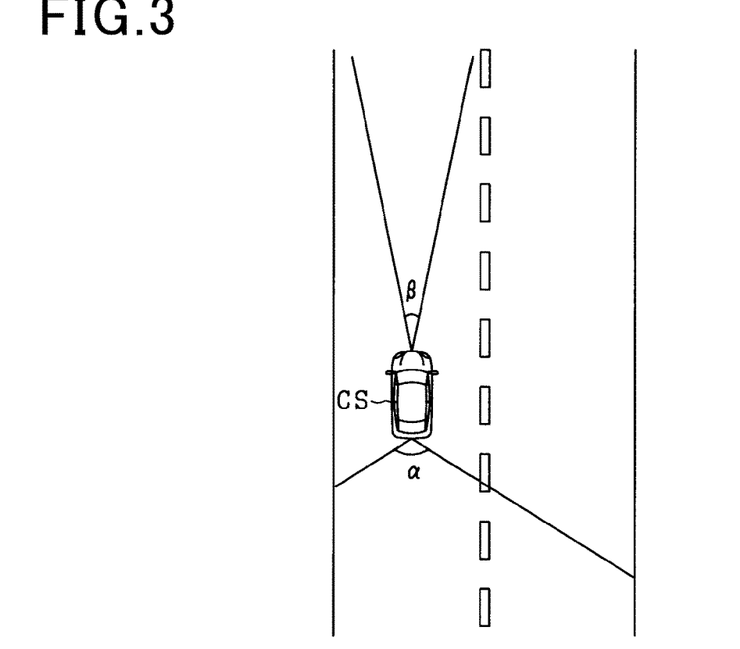
FIG. 3 is a diagram of a detection range of a radar sensor.

Specifically, as shown in FIG. 3, the radar sensor 31 has a detection angle of about 50 degrees to 140 degrees and a range up to a distance that is about 50 meters away from the own vehicle CS as the detection range. Meanwhile, in the case of the radar sensor attached to the vehicle front, the radar sensor often has a detection angle of about 20 degrees to 30 degrees, and a detection range up to a distance that is about 100 meters away from the own vehicle CS.

The driving assistance ECU 20 acquires the radar detection information from the radar sensor 31 that has such a detection range, and detects the position Pr of the target object Ob. Therefore, the driving assistance ECU 20 can effectively detect the target object OB to the rear of the own vehicle CS where many blind spots of the driver are present, and perform the collision determination.

In particular, during traveling in reverse, for example, a position of a vehicle that travels beside the own vehicle from obliquely behind the own vehicle CS is difficult to recognize. In addition, the own vehicle CS often travels in reverse when parking a parking lot or the like. However, because the speed of the vehicle is low in a parking lot, the steering angle of the vehicle tends to be large, and the movement of the vehicle tends to be irregular. As a result, in a parking lot or the like, other vehicles more often turn and approach the vehicle from a blind spot of the driver, compared to on a road or the like, and movements of other vehicles are difficult to ascertain. Therefore, widening the detection angle of the radar sensor 31 in the vehicle rear and performing PCS when the own vehicle CS is traveling in reverse is particularly useful to the driver.

Figure 4:
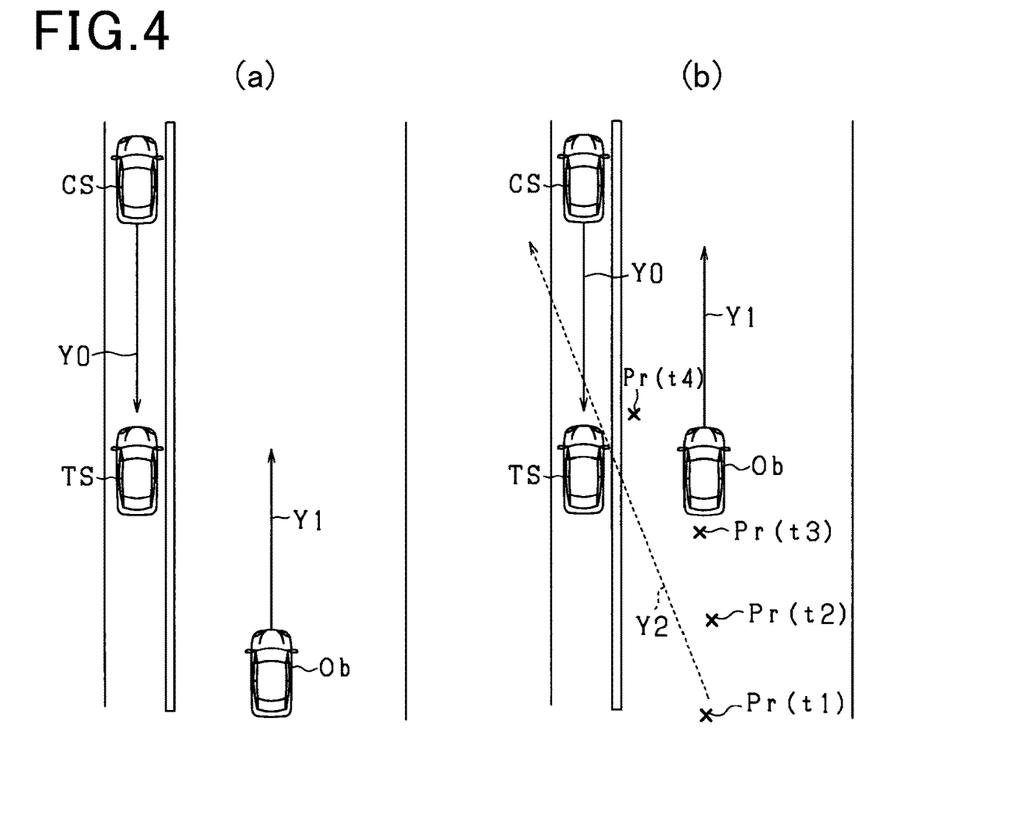
FIG. 4 illustrates, by (a) and (b), diagrams of a state in which erroneous detection occurs.

However, as a result of the detection angle being widened, the effects of unwanted reflected waves are received, and the likelihood of the occurrence of an erroneous detection of the target object Ob increases. For example, as a state in which an erroneous detection occurs, a state such as that shown in FIG. 4 can be considered. FIG. 4 shows a state in which, when the own vehicle CS is traveling directly backwards in reverse to perform parallel parking in a roadside zone (indicated by an arrow Y0 in FIG. 4), a stopped vehicle TS is present directly behind the own vehicle CS and the target object Ob (traveling vehicle) that passes to the side of (beside) the stopped vehicle TS from obliquely behind the stopped vehicle TS is present.

In addition, in FIG. 4, the target object Ob (traveling vehicle) that is traveling from behind the own vehicle CS advances straight ahead in the traffic lane adjacent to the roadside zone and passes beside the own vehicle CS (indicated by an arrow Y1 in FIG. 4). In this case as well, as shown in FIG. 4 by (b), when the target object Ob approaches the stopped vehicle TS and is abreast of the stopped vehicle TS, the effects of the reflected waves (unwanted waves) from the stopped vehicle TS are received, and the unwanted waves are erroneously detected as the reflected waves from the target object Ob.

When an erroneous detection is made in this manner, the position Pr of the target object Ob is detected as an erroneous position Pr(t4). As a result, the route of the target object Ob becomes erroneous. A reason for this is that, because the driving assistance ECU 20 estimates the route of the target object Ob based on the changes (history information) in the position Pr of the target object Ob, when the effects of the erroneously detected position Pr(t4) are received, an erroneous route Y2 (indicated by an arrow in FIG. 4 by (b)) is estimated.

Specifically, as the route Y2, a route in which the target object Ob passes directly behind the own vehicle CS (more specifically, the position of the stopped vehicle TS) and further approaches the rear of the own vehicle CS is estimated. Here, the route Y2 such as that which approaches directly behind the own vehicle CS is estimated due to the effects of the past position Pr (t1) to position Pr (t3) that are detected when the target object Ob is advancing straight ahead. If the collision determination is performed based on an erroneous route such as this, a determination that a collision with the traveling vehicle will occur may be made regardless of the collision not occurring, and unnecessary PCS may be performed.

Here, when the vehicle is advancing straight ahead, such unnecessary PCS tends not to occur. A reason for this is that, because the detection angle of the radar sensor is narrow in the front, even when another vehicle makes a turn near the own vehicle CS, the other vehicle is not easily detected. In addition, when another vehicle turns at a far-away distance, the other vehicle may enter the detection range and be erroneously detected. However, because the collision margin time is long, PCS is not performed.

Therefore, the driving assistance ECU 20 includes the area setting unit 27 that sets a non-operating area F1 in which vehicle control related to PCS is not performed. This will be described in detail below.

When the position Pr of the target object Ob is detected, the area setting unit 27 sets the non-operating area F1 with reference to the position Pr of the target object Ob. Specifically, the area setting unit 27 sets an area that is wider in the vehicle-width direction (X-axis direction) than the width of a traffic lane with the target object Ob as the center, as the non-operating area F1. At this time, when the position of the own vehicle CS and the position of the target object Ob differ in the X-axis direction, the area setting unit 27 sets the non-operating area F1 on at least the own vehicle CS side relative to the target object Ob in the X-axis direction. More specifically, the area setting unit 27 sets the non-operating area F1 within an area of 3 meters on the own vehicle CS side with the detected position Pr of the target object Ob as the center in the X-axis direction. In addition, the area setting unit 27 sets the non-operating area F1 for each target object Ob.

Here, the non-operating area F1 is set to be infinite in the Y-axis direction. The width of a traffic lane is typically 2.5 meters to 3.5 meters. In addition, the non-operating area F1 is set only at an initial detection of the target object Ob. Furthermore, when the position of the own vehicle CS and the position of the target object Ob do not differ in the X-axis direction, the non-operating area F1 is set on both sides in the X-axis direction side with the target object Ob as the center.

Figure 5:
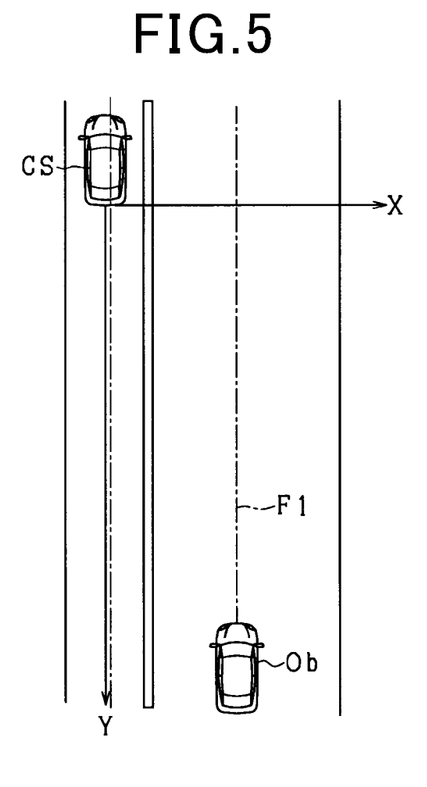
FIG. 5 is a diagram of a non-operating area.

A state of a vehicle will be described with an example thereof being shown in FIG. 5. FIG. 5 shows a state in which the target object Ob (other vehicle) is traveling behind and to the right of the own vehicle CS. More specifically, a state in which the target object Ob is traveling in the center of a traffic lane that is adjacent to the roadside zone is shown. In this case, when the target object Ob is detected, the area setting unit 27 sets the non-operating area F1 to be a 3-meter area on the own vehicle CS side (right side in FIG. 5) with the detected position Pr of the target object Ob as the center (reference). The non-operating area F1 is set to be infinite in the Y-axis direction.

The area of the non-operating area F1 may be arbitrarily changed. For example, an area based on the vehicle width of the own vehicle CS or the width of the target object Ob may be set. In addition, for example, the non-operating area F1 may be set to any area from 1 meter to 5 meters. Furthermore, the non-operating area F1 may be set on both sides of the target object Ob in the X-axis direction. Still further, although the non-operating area F1 is set with reference to the center position of the target object Ob, the non-operating area F1 may be set with reference to an end portion (such as an end portion on the own vehicle CS side) of the target object Ob in the width direction. Moreover, the position of the target object Ob at the initial detection may not be included. For example, the non-operating area F1 may be set in an area that is 1 meter to 3 meters away from the target object Ob. In addition, an area in the Y-axis direction may be prescribed. For example, the non-operating area Ob may be set within an area from the detected position Pr of the target object Ob to the own vehicle CS.

Then, after setting the non-operating area F1, the area setting unit 27 maintains the non-operating area F1 until the target object Ob is detected outside the non-operating area F1 of the target object Ob. Then, when the target object Ob is detected outside the non-operating area F1, the area setting unit 27 resets the non-operating area F1 of the target object Ob. Here, the area setting unit 27 may reset the non-operating are F1 when the own vehicle CS makes a turn. Specifically, the non-operating area F1 may be reset when the own vehicle CS moves a predetermined distance (such as 3 meters) in the X-axis direction after the non-operating area F1 is set. In addition, the non-operating area F1 may be reset when the steering angle becomes an angle other than 0 degrees. That is, a reason for this is that, when the own vehicle CS moves in the X-axis direction, the likelihood of the own vehicle CS approaching and colliding with the target object Ob increases. In addition, the non-operating area F1 may be reset when the position Pr of the target object Ob can no longer be detected (the position Pr is outside the detection range).

Then, the driving assistance ECU 20 performs a collision determination process at a predetermined cycle (such as 80 milliseconds) to perform PCS. Hereafter, the collision determination process will be described with reference to FIG. 6.

Figure 6:
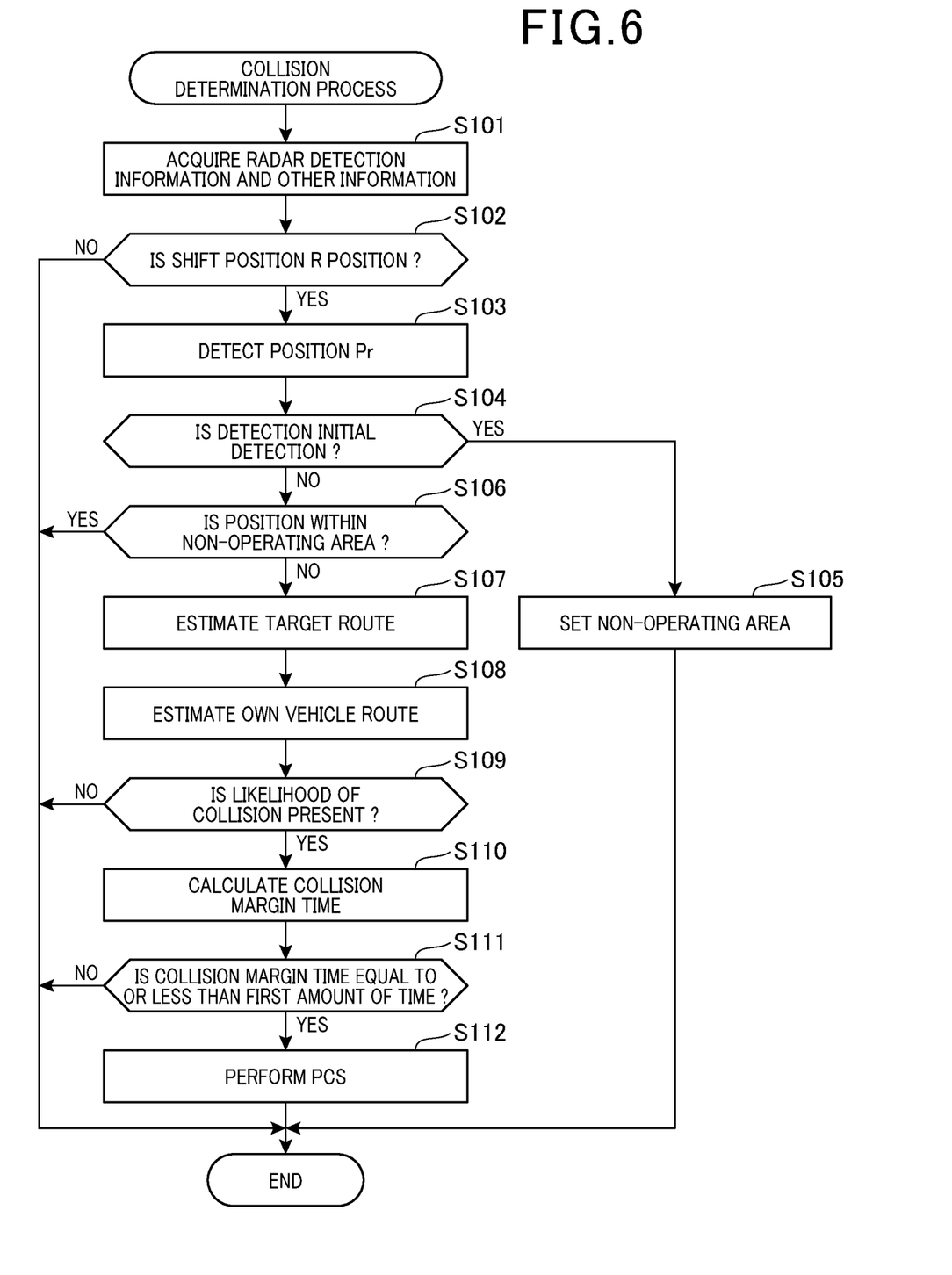
FIG. 6 is a flowchart of a collision determination process.

The driving assistance ECU 20 acquires the radar detection information inputted from the radar sensor 31 (step S101). In addition, the acquiring unit 21 acquires the information indicating the vehicle speed of the own vehicle CS from the vehicle speed sensor 32, and acquires the information indicating the steering angle from the steering angle sensor 33. Furthermore, the acquiring unit 21 acquires the information indicating the shift position from the transmission 70.

The driving assistance ECU 20 determines whether the shift position is the R position (step S102). When determined that the shift position is not the R position (No at step S102), the driving assistance ECU 20 ends the collision determination process.

Meanwhile, when determined that the shift position is the R position (Yes at S102), the driving assistance ECU 20 detects the position Pr of the target object Ob based on the radar detection information (step S103). In addition, the driving assistance ECU 20 records the detected position Pr in the history information.

The driving assistance ECU 20 determines whether the detected target object Ob is a target object Ob that is detected for the first time (initial detection) (step S104). Specifically, the driving assistance ECU 20 performs the determination based on whether the target object Ob is present in the history information. When determined that the target object Ob is a target object Ob that is detected for the first time (Yes at step S104), the driving assistance ECU 20 sets the non-operating area F1 of the target object Ob with reference to the target object Ob (step S105). Subsequently, the driving assistance ECU 20 ends the collision determination process.

Meanwhile, when determined that the target object Ob is not a target object Ob that is detected for the first time (No at step S104), the driving assistance ECU 20 determines whether the position Pr of the detected target object Ob is within the non-operating area F1 of the target object Ob (step S106). That is, the driving assistance ECU 20 determines whether the position Pr of the target object Ob is within the non-operating area F1 in the X-axis direction. Here, when the non-operating area F1 is not set, the driving assistance ECU 20 determines that the position Pr of the target object Ob is not within the non-operating area F1.

When determined that the position Pr of the detected target object Ob is within the non-operating area F1 (Yes at step S106), the driving assistance ECU 20 ends the collision determination process. As a result, the collision determination is not performed, and therefore, PCS is also not performed.

When determined that the position Pr of the detected target object Ob is not within the non-operating area F1 of the target object Ob (No at step S106), the driving assistance ECU 20 estimates the route of the target object Ob based on the changes in the position Pr stored as the history information (step S107). In addition, the driving assistance ECU 20 estimates the route of the own vehicle CS based on the steering angle and the like (step S108).

Next, the driving assistance ECU 20 determines a likelihood of a collision between the own vehicle CS and the target object Ob based on the estimated route of the target object Ob and the estimated route of the own vehicle CS (step S109). When determined that the likelihood of a collision is not present (No at step S109), the driving assistance ECU 20 ends the collision determination process.

Meanwhile, when the likelihood of a collision is present (Yes at step S109), the driving assistance ECU 20 calculates the collision margin time (step S110). Then, the driving assistance ECU 20 determines whether the calculated collision margin time is equal to or less than a predetermined first amount of time (step S111). The first amount of time is a threshold that indicates a start timing for PCS. For example, the first amount of time is set to a value such as 30 seconds. When determined that the collision margin time is not equal to or less than the first amount of time (No at step S111), the driving assistance ECU 20 ends the collision determination process.

When determined that the collision margin time is equal to or less than the first amount of time (Yes at step S111), the driving assistance ECU 20 performs PCS by controlling the warning apparatus 50, the braking apparatus 40, and the seatbelt apparatus 60 based on the collision margin time (step S112). For example, when the collision margin time is equal to or less than the first amount of time, the driving assistance ECU 20 controls the warning apparatus 50 and outputs a warning. When the collision margin time is equal to or less than a second amount of time (such as 15 seconds) that is shorter than the first amount of time, the driving assistance ECU 20 controls the braking apparatus 40, in addition to the warning apparatus 50, and brakes the own vehicle CS. When the collision margin time is equal to or less than a third amount of time (such as 5 seconds) that is shorter than the second amount of time, the driving assistance ECU 20 controls the seatbelt apparatus 60, in addition to the warning apparatus 50 and the braking apparatus 40, and performs pulling of the seatbelt or the like. The driving assistance ECU 20 then ends the collision determination process.

The following effects are obtained as a result of the configuration described above.

When the target object Ob is detected, the driving assistance ECU 20 sets the non-operating area F1 in a predetermined area with reference to the target object Ob in the X-axis direction that is orthogonal to the advancing direction of the own vehicle CS. As a result, for example, even if a cause of occurrence of unwanted reflected waves (that is, a cause of occurrence of an erroneous detection), such as a stopped vehicle, is present within the non-operating area F1, the collision determination is not performed and unnecessary PCS is not performed. Therefore, for example, even if another vehicle passes beside the own vehicle and the stopped vehicle when advancing straight ahead in an adjacent traffic lane, unnecessary PCS being performed, that is, vehicle control for performing PCS, can be suppressed.

Meanwhile, when the target object Ob is detected in an area other than the non-operating area F1 based on the reflected waves, the collision determination is performed. Therefore, for example, in cases in which the target object Ob moves so as to make a turn from an adjacent traffic lane into the own traffic lane or the like, the collision determination is performed and necessary PCS can be performed.

The radar sensor 31 has a detection range behind the own vehicle CS over which at least the position Pr of the target object Ob present in the own traffic lane and the adjacent traffic lane adjacent to the own traffic lane is detected. Therefore, the target object Ob is detected over a wide area even behind the own vehicle CS where many blind spots of the driver are present. Consequently, for example, even if the target object Ob is present in a blind spot of the driver when the own vehicle CS travels in reverse in a parking lot or the like, a collision can be effectively avoided or suppressed.

Conversely, when the detection angle of the radar sensor 31 is widened in this manner, the likelihood of an occurrence of an erroneous detection increases compared to when the detection angle is narrow (such as when only the own traffic lane is in the detection range). For example, the likelihood of an erroneous detection increases between the stopped vehicle TS that is stopped in a roadside zone and the target object Ob that is a traveling vehicle that is advancing straight ahead in a traffic lane adjacent to the roadside zone and passes beside the stopped vehicle TS. In addition, for example, the likelihood of an erroneous detection increases between a vehicle that is to the rear in the own traffic lane and the target object Ob that is passing by in an adjacent traffic lane. However, because the driving assistance ECU 20 sets the non-operating area F1 in a predetermined area in the X-axis direction with reference to the target object Ob, even if the detection angle of the radar sensor 31 is widened in this manner, unnecessary PCS being performed can be suppressed.

When the target object Ob is detected in the adjacent traffic lane, if the target object Ob is subsequently detected within an area that corresponds to the traffic lane width in the X-axis direction with reference to the target object Ob, the likelihood of the detection being based on unwanted reflected waves is high. Meanwhile, the likelihood of the target object Ob making a turn so as to approach the rear of the own vehicle CS is low (the likelihood of the target object Ob advancing straight ahead within the traffic lane is high). A reason for this is that, when the target object Ob is detected in the adjacent traffic lane, it is thought that if the target object Ob is approaching the rear of the own vehicle CS, the target object Ob will be detected outside the area corresponding to the traffic lane width in the X-axis direction. Therefore, the area setting unit 27 sets an area that is at least wider than the width of the traffic lane with reference to the target object Ob as the non-operating area F1. Consequently, an area in which the likelihood of unnecessary PCS being performed is high can be set as the non-operating area F1, and unnecessary PCS being performed can be suppressed.

Even if the target object Ob moves to an area away from the own vehicle CS, a determination that a collision will occur is not made. That is, even when the target object Ob is erroneously detected in the area away from the own vehicle CS, the determination that a collision will occur is not made and, therefore, PCS is also naturally not performed. Therefore, the driving assistance ECU 20 sets the non-operating area F1 on the own vehicle CS side relative to the target object Ob. As a result, the non-operating area F1 can be appropriately set and processing load can be reduced.

OTHER EMBODIMENTS

The present disclosure is not limited to the above-described embodiment and, for example, may be carried out in the following manner. Hereafter, sections that are identical or equivalent to each other among the embodiments are given the same reference numbers. Descriptions of sections having the same reference numbers are applicable therebetween.

When the target object Ob is a traveling vehicle, the likelihood of the effects of erroneous reflected waves (unwanted waves) being received is high. Therefore, the area setting unit 27 may set the non-operating area F1 when the target object Ob is determined to be a traveling vehicle. As a result, the non-operating area F1 being set even when the likelihood of the effects of unwanted waves being received is low can be suppressed. Here, whether the target object Ob is a vehicle may be determined based on the radar detection information, such as the width of the target object Ob, the strength of the reflected waves, and the relative speed. In addition, an imaging apparatus such as a camera may be provided. Whether the target object Ob is a vehicle may be determined by, for example, pattern matching being performed based on the captured image.

The PCSS 100 may be used to perform PCS in the own vehicle CS relative to a target object Ob that is ahead of the own vehicle CS.

The area setting unit 27 may set the non-operating area F1 when the route of the target object Ob is estimated. In this case, the non-operating area F1 may be set with reference to the position Pr of the target object Ob included in the history information. For example, the non-operating area F1 may be set with reference to the newest position Pr of the target object Ob included in the history information. Alternatively, the non-operating area F1 may be set with reference to an initial position Pr. In addition, a reference position in the X-axis direction may be calculated by an average of a plurality of positions Pr being obtained, and the non-operating area F1 may thereby be set.

The area setting unit 27 may set the non-operating area F1 when the target object Ob is determined to be advancing straight ahead to the side of the own vehicle CS (such as in an adjacent traffic lane). Specifically, the non-operating area F1 may be set when the distance between the own vehicle CS and the target object Ob in the X-axis direction is equal to or greater than a predetermined distance, and the estimated route of the target object Ob and the estimated route of the own vehicle CS do not intersect. The predetermined distance may be set taking into consideration the vehicle width and the width of the traffic lane. For example, the predetermined distance may be 1.5 meters.

In addition, for example, the position Pr of the target object Ob may be sampled at a predetermined cycle. The non-operating area F1 may be set when a percentage of the positions Pr present within a predetermined area among all sampled positions Pr is equal to or greater than a predetermined percentage. Specifically, the non-operating area F1 may be set when, with reference to the target object Ob that is detected first, 90 percent or more of the positions Pr of the target object Ob among all of the positions Pr is detected within a 4-meter area in the Y-axis direction and an area within a predetermined angle (such as 20 degrees) ahead of the target object Ob (on the own vehicle CS side) serving as the reference. As a result, necessary PCS can be performed when the target object Ob changes route such as by making a turn, while suppressing unnecessary PCS (vehicle control).

The area setting unit 27 may set the non-operating area F1 when the target object Ob that is advancing straight ahead to the side of the own vehicle CS is detected behind the own vehicle CS and a stopped vehicle is present directly behind the own vehicle CS. For example, a case in which a stopped vehicle is present directly behind the own vehicle CS is a case in which, based on the radar detection information, a stopped vehicle (target object) that differs from the target object Ob and is present within the vehicle width of the own vehicle CS in the X-axis direction and within an area of which the distance in the Y-axis direction is a predetermined distance is detected. As a result, the non-operating area F1 can be set when the likelihood of unnecessary PCS being performed is high, and unnecessary PCS can be suppressed.

The area setting unit 27 may not set the non-operating area F1 when the target object Ob is detected in the own traffic lane.

According to the above-described embodiment, the millimeter-wave radar apparatus is used as the probe apparatus. However, a sonar that searches for and measures the distance of a target object (object) using sound waves may be used.

The area setting unit 27 may changes the area that is set as the non-operating area F1 based on the distance between the own vehicle CS and the target object Ob in the X-axis direction. For example, the area may be widened when the distance between the own vehicle CS and the target object Ob is long, compared to when the distance is short.

According to the above-described embodiment, PCS is performed based on the collision margin time. However, a predicted distance to collision may be calculated and PCS may be performed based on the predicted distance. The driving assistance ECU 20 calculates the predicted distance by calculating an intersection point of the estimated routes and calculating the distance to the intersection point.

While the present disclosure has been described with reference to embodiments thereof, it is to be understood that the disclosure is not limited to the embodiments and constructions. The present disclosure is intended to cover various modification examples and modifications within the range of equivalency. In addition, various combinations and configurations, and further, other combinations and configurations including more, less, or only a single element thereof are also within the spirit and scope of the present disclosure.

The invention claimed is:

1. A vehicle control apparatus comprising:
    an acquiring unit that acquires detected information from a probe apparatus that transmits probe waves and receives reflected waves that are reflected by a target object, the detected information being based on the reflected waves;
    a target object information detecting unit that detects a position of the target object based on the detected information;
    a target object route estimating unit that estimates a route of the target object based on changes in the position of the target object detected by the target object information detecting unit;
    an own vehicle route estimating unit that estimates a route of an own vehicle;
    a collision determining unit that determines whether the own vehicle and the target object will collide, based on the route of the target object estimated by the target object route estimating unit and the route of the own vehicle estimated by the own vehicle route estimating unit;
    a vehicle control unit that performs vehicle control of the own vehicle when the collision determining unit determines that the own vehicle and the target object will collide; and
    an area setting unit that sets a non-operating area for vehicle control, wherein
    the area setting unit sets, as the non-operating area, a predetermined area with reference to a position in which the target object is detected, in a lateral direction that is orthogonal to an advancing direction of the own vehicle.

2. The vehicle control apparatus according to claim 1, wherein:
    the acquiring unit acquires the detected information of a position of a target object behind the own vehicle from the probe apparatus, and the target object information detecting unit detects a position of a target object that is present in at least an own traffic lane in which the own vehicle is traveling and an adjacent traffic lane that is adjacent to the own traffic lane behind the own vehicle;
    the target object route estimating unit estimates a route of a target object that is approaching from behind the own vehicle; and
    the own vehicle route estimating unit estimates the route of the own vehicle when the own vehicle is traveling in reverse.

3. The vehicle control apparatus according to claim 2, wherein:
    the predetermined area is an area that is at least wider than a width of a traffic lane with the target object as a center, in the lateral direction.

4. The vehicle control apparatus according to claim 3, wherein:
    when a position of the target object and a position of the own vehicle differ in the lateral direction, the non-operating area is set on at least the own vehicle side relative to the target object in the lateral direction.

5. The vehicle control apparatus according to claim 4, wherein:
    the area setting unit sets the non-operating area when the target object is determined to be a traveling vehicle.

6. The vehicle control apparatus according to claim 3, wherein: the area setting unit sets the non-operating area when the target object is determined to be the traveling vehicle.

7. The vehicle control apparatus according to claim 2, wherein: when the position of the target object and the position of the own vehicle differ in the lateral direction, the non-operating area is set on at least the own vehicle side relative to the target object in the lateral direction.

8. The vehicle control apparatus according to claim 2, wherein: the area setting unit sets the non-operating area when the target object is determined to be the traveling vehicle.

9. The vehicle control apparatus according to claim 1, wherein:

when a position of the target object and a position of the own vehicle differ in the lateral direction, the non-operating area is set on at least the own vehicle side relative to the target object in the lateral direction.

10. The vehicle control apparatus according to claim 1, wherein:

the area setting unit sets the non-operating area when the target object is determined to be a traveling vehicle.

11. A vehicle control method comprising:

acquiring detected information from a probe apparatus that transmits probe waves and receives reflected waves that are reflected by a target object, the detected information being based on the reflected wave;

detecting a position of the target object based on the detected information;

estimating a route of the target object based on changes in the detected position of the target object;

estimating a route of an own vehicle;

determining whether the own vehicle and the target object will collide based on the estimated route of the target object and the estimated route of the own vehicle;

performing vehicle control of the own vehicle when the own vehicle and the target object are determined to collide; and setting a non-operating area for vehicle control, wherein a predetermined area with reference to a position in which the target object is detected in a lateral direction that is orthogonal to an advancing direction of the own vehicle is set as the non-operating area.

\* \* \* \* \*